Patented Apr. 12, 1927.

1,624,711

UNITED STATES PATENT OFFICE.

ABRAHAM S. BEHRMAN, OF CHICAGO, ILLINOIS, ASSIGNOR, BY MESNE ASSIGNMENTS, TO GENERAL ZEOLITE COMPANY, OF CHICAGO, ILLINOIS, A CORPORATION OF ILLINOIS.

WATER-SOFTENING REAGENT AND PROCESS OF PREPARING SAME.

No Drawing. Application filed October 1, 1921. Serial No. 504,677.

This invention relates generally to the art of water softening, and more particularly to materials or re-agents of a sort commonly known as base exchange materials and commonly employed in processes of water softening. The present invention comprises an improved material of this type, and also a new process by which the same may be produced.

There are known in the water softening art various materials, some of which occur in nature and others of which are made synthetically or capacitated by treatment, which are referred to generally as base exchange materials, and whose characterizing quality is their facility for exchanging certain chemical bases which they carry, such as sodium or potassium, for other undesirable bases present in water, such as calcium and magnesium, when water containing salts of these metals is brought into contact with them. Among these base exchange materials are the so-called zeolites, and glauconites, of which the former may be described roughly as hydrated double silicates of aluminum, and the latter as hydrated double silicates of iron, both containing other elements which contribute toward their characteristic capabilities. In nature, these base exchange materials, or materials capable of acquiring base exchange properties by suitable treatment, occur sometimes in the form of clays and sometimes in other forms. A familiar type of the latter is the glauconite, or glauconitic material commonly known as green-sand, extensive deposits of which occur in various places in the United States and it is to this material that the present invention particularly pertains.

Among the qualities which a base exchange material should possess in order to qualify it for effective, economical and satisfactory industrial employment, are economy of cost, activity in its base exchanging function both as to original exchange and regenerating exchange, high capacity for effecting such exchange, and durability under usage.

The general purpose of the present invention is the provision of a method for the treatment of natural glauconites having or capable of acquiring base exchange characteristics, for the purpose of giving them the qualities just mentioned or for augmenting such qualities in them.

Another object of the invention is the provision of such a process which may be practiced very economically to produce a product of high quality.

A further object of the invention is an improved process for preparation of durable base exchange materials at low cost and a new base exchange material which may be produced by such process.

A further object of the invention is a process for the production of an effective commercial water softening material from natural green sand.

A specific object of the invention is a process for the treatment of the glauconite known as green-sand to give it desirable qualifications for employment industrially as a base exchange material.

Another specific object of the invention is an improved glauconite base exchange material having advantageous qualifications for industrial employment in water softening.

Other specific objects of the invention are the provision of a process for treatment of green-sand to increase its resistance or stability against erosion or disintegration and to augment its base exchange capabilities.

As suggested above, while various glauconite materials found in nature possess base exchange characteristics to a certain extent, their physical conditions may be such as to make them unsuitable for industrial employment in water softening. That is to say, the material is not sufficiently hard and resistant to the action of water flowing through it, or to the action of the solutions employed for regenerating it, with the result that it is partly dissolved or disintegrated, the treated water being rendered turbid or discolored and the material being destroyed too rapidly for efficient employment. This is true of the glauconite commonly known as green sand, when in its natural condition, and my invention resides primarily in treating the natural glauconite with a solution of alkali metal silicate, such as sodium silicate. By such treatment I produce a material which is hard and firm and effectively resistant to the action of water and the regenerating solution, so that it will not disintegrate, soften, or crumble when employed in customary fashions. Furthermore, by such treatment I produce a material having a capacity for water softening which is much increased over that of natural green sand, as is also its activity.

I will describe the invention by setting out specifically one particular procedure, together with certain suggested variations and additions, but it is to be understood that this particular disclosure is made for the purpose of illustration merely, and is not to be construed or understood as limiting the invention to the particular material or treatment, as it is applicable to various natural glauconite base exchange materials and susceptible of various modifications not herein specifically mentioned, without departure from the essential features which I have originated and which I claim as my invention.

I will describe, for illustration, the treatment of a mineral glauconite of the sort which, as it occurs in nature, is commonly known as green-sand, and which is essentially a hydrated double silicate of potassium and iron, possessing the property of being able to exchange some of its potassium for other elements such as calcium and magnesium, and to re-exchange such calcium or magnesium for potassium or sodium when treated with a strong solution of a potassium compound such as potassium chloride, or with a solution of sodium chloride. By such regenerating treatment the calcium and magnesium which have been absorbed by the glauconite are converted into calcium chloride and magnesium chloride and replaced by potassium or sodium from the regenerating solution, so that the treated glauconite is again ready to exchange its potassium or sodium for calcium or magnesium in solution. While greensand glauconite, which occurs in nature in the form of rather hard grains, possesses these characteristics in varying degree, it is not suitable in its natural condition for many industrial uses as a base exchange material, as its capacity per unit of weight is not sufficiently high. Nor is its activity sufficiently rapid and its term of serviceability sufficiently long to render its use practical or efficient, as it will not take care of sufficient volume of liquid per unit of time, and requires the placing of apparatus out of operation at frequent intervals to permit renewal or replacement of the material. A typical method for treating green-sand to produce an efficient base exchange material according to my invention, is as follows:

A treating solution is prepared by diluting one volume of a sodium silicate solution having a density of about 40° Baumé with nine volumes of water. The green-sand or glauconite in its natural form, preferably cleaned and of substantially uniform mesh, is then treated with this solution for about an hour by immersion therein, the solution being maintained at or near the boiling temperature, and the material being stirred occasionally. This ordinarily is adequate to produce substantially chemical saturation of the glauconite with silicate from the treating solution. The treating solution being then drained off, the material may then be washed with water and subsequently dried, or it may be dried without washing with water. This treatment produces a chemical change in the constitution of the glauconite. As evidence of the chemical reaction of the sodium silicate solution on the glauconite, is the increased amount of silica in the resulting product. As an example, instances have been noted in which the glauconite, which in the raw state contained about 45.72 per cent silica, had the silica increased to about 50.5 per cent by the treatment as explained. This increase of 4.78 per cent in the percentage composition of the glauconite corresponds to an increase of about 10.46 per cent in the amount of silica itself. Coincidental with the increase in silica, the base exchange capacity of the glauconite is much increased, the increase in most cases being over 50 per cent or even considerably more than that of the raw material. Thus, while the good grades of glauconite in the natural state may have a base exchange capacity of as high as 35 grains calcium carbonate equivalent per pound, the same material, when processed according to this invention has been found to attain a resultant base exchange capacity as high as 55 grains per pound, and sometimes more.

While the particular method just described is one which I have used successfully, it may be varied, within the scope of my invention, by the use of other alkali metal silicates to form the treating solution, the employment of solutions of other strengths, the treatment of the green-sand without heat, or with the aid of heat and pressure. Moreover, at times I have found it advantageous to employ in connection with the alkali metal silicate solution a small amount of an alkali metal salt or compound such as, for example, two per cent by weight of sodium carbonate, which is added to the silicate solution.

In instances the effectiveness of the process may be augmented by preceding the treatment of the material with the alkali metal silicate solution by various preliminary treatments having the effect of increasing the efficacy of the treatment with the alkali metal silicate solution. For example, I may precede the alkali metal silicate treatment by a treatment with a solution of an alkali metal salt, such as sodium chloride. This solution of alkali metal salt may vary considerably in strength and may be used cold, hot or hot and with pressure and for varying periods of time. As a typical example of such pre-treatment, I may soak the base exchange material in a cold ten per cent solution of sodium chloride for about fifteen hours, with occasional agitation. After such treatment with the brine solution, the treatment with the alkali metal silicate solution may be employed as above described.

Another pre-treatment which I have found to be highly advantageous in various instances is to first cleanse the base exchange material with a weak dilute solution of a mineral acid, for example, a two per cent hydrochloric acid solution or an equivalent acid solution, either hot or cold, for a convenient period of time, for example two hours. After the material is cleansed in this manner I wash it with water to remove most of the excess acid, then treat it with a solution of common salt to which has been added a small amount of alkali to neutralize any acid left from the cleansing process. A suitable solution for such neutralizing treatment is one which comprises ten per cent of common salt and one-tenth per cent of caustic soda. After treatment of the material with this neutralizing solution for an appropriate period, for example, fifteen hours, I follow with a treatment with the alkali metal silicate solution such as the one above described. After treatment with the silicate solution the material should be well washed with water to remove any un-absorbed quantity of the silicate which might encrust the surface of the grains and lower the activity of the material.

The invention as above described is particularly advantageous because of the low cost of practicing the process and producing the product, and results in provision of an improved water softening material which is of greatly increased durability, very active, of high exchange capacity and of low production cost.

In various instances other than the specific example given, it may be necessary or desirable to bake or frit the natural material in order to give it the structural characteristics which render it permeable to liquids and resistant to their disintegrating influences. This is particularly the case where the natural material occurs as a clay or friable earth. Material of this nature must be formed into grains and fritted by heat in order to adapt it for the passage of the water through a bed of it. The treatment of material of this nature with the alkali metal silicate solution as above described may be accomplished either before or after the fritting operation. Moreover, in instances it may be desirable in the treatment of glauconite or green-sand to bake the material at temperatures between 350° and 400° C. for a period of about twenty minutes, after the treatment with the alkali metal silicate solution. The temperature of baking, and the time thereof, may be varied considerably, depending on the specific properties desired in the finished product.

Although raw glauconite or green-sand can be subjected to treatment with sodium silicate with advantageous results, it is frequently preferred to use modified or altered glauconites or green-sands such as those which have been treated with an acid solution such as hydrochloric acid or those who have had their potassium base replaced by other alkali-forming metal bases. The expression "glauconitic material" used in the claims includes raw glauconite or green sand as well as substances derived therefrom whose base exchange properties will be improved by treatment with an alkali metal silicate

I claim:

1. In the art of preparing glauconitic materials for treatment of liquids, a process comprising the treatment of the glauconitic material with a solution of sodium silicate for a sufficient length of time to result in substantial improvement in the base exchange properties, and then washing the material to remove the excess silicate.

2. In the art of preparing liquid treating materials, a process which comprises treating green-sand with a weak acid solution and subsequently with an alkali-metal silicate in a solution approximating boiling temperature for a sufficient length of time to result in substantial improvement in the base exchange properties.

3. A process of preparing materials for liquid treatment which comprises indurating green-sand by the action of a solution of sodium silicate, followed by removal of uncombined silicate.

4. The art of conditioning green-sand for water softening uses and the like, which comprises soaking it in a solution of an alkali-metal silicate until it reaches substantially the point of chemical saturation.

5. A process of preparing base exchange material for water softening uses and the like, which comprises heating green-sand in a solution of an alkali-metal silicate for a sufficient length of time to result in substantial improvement in the base exchange properties and maintaining its surface free of additional deposit.

6. In the art of treating water, a process which comprises heating green-sand in a solution of an alkali-metal silicate until its composition is modified followed by removal of uncombined silicate.

7. The process of preparing a base exchange material which comprises submitting glauconite to the action of a solution of a common alkali-metal salt, and then to a reaction with an alkali-metal silicate solution.

8. In the art of treating water, a process which comprises submitting green-sand to the action of a sodium chloride solution and then to the action of a solution of an alkali-metal silicate for a sufficient length of time to result in substantial improvement in the base exchange properties.

9. A process of conditioning a base exchange material which comprises submitting green-sand to contact with a sodium salt solution to establish a sodium base in the green-sand, and then submitting the material to reaction with an alkali-metal silicate solution until its composition is modified.

10. A water softening material consisting of the solid product of the chemical combination of an alkali-metal silicate with glauconitic material.

11. A water softening material comprising the product of the reaction of an alkali-metal silicate solution upon green-sand, said product retaining the external appearance of the original green-sand free of additional coating.

12. A water softening material comprising green-sand indurated with an alkali-metal silicate and free from additional surface coating.

13. A water treating material formed from green-sand and preserving the general physical characteristics thereof but with augmented cohesion and base exchange capacity.

14. A water softening material consisting of the water-insoluble reaction product of sodium silicate upon glauconitic material.

15. A process of improving glauconite for water softening purposes which comprises treating glauconitic material with a solution of an alkali metal silicate to the point where the chemical action of the latter substantially ceases.

16. A process of conditioning glauconitic material for water softening uses and the like, which comprises first submitting the material to treatment with a dilute mineral acid neutralizing the acid remaining on the material after such treatment and then soaking the material in a solution of an alkali-metal silicate.

17. A process of making water treating material having base exchange qualities, which comprises treating natural green sand or glauconite with a dilute solution of a mineral acid, then neutralizing the acidity of the material, then treating the material in a bath of sodium silicate solution at approximately boiling temperature, and finally washing the treated material to remove any unabsorbed excess of the silicate.

18. A process of preparing water treating material having base exchange qualities, which comprises treating natural green sand or glauconite with a dilute mineral acid solution, then neutralizing the acidity of the material, then subjecting the material to a bath of an alkali-metal silicate solution at substantially a boiling temperature, then washing the granular material to remove unabsorbed excess of the silicate, and finally subjecting the granular material to a dry heat treatment at a hardening temperature.

19. A process of making water treating material having base exchange characteristics, which comprises treating natural green sand or glauconite with a dilute mineral acid solution, then neutralizing the acidity of the material and treating it in a bath of an alkali salt solution, next subjecting the material to treatment in a bath of an alkali-metal silicate solution at substantially boiling temperature, and then washing the granular material for removal of unabsorbed silicate.

20. A process which comprises treating a glauconitic material with an alkali metal silicate for at least about an hour.

21. The process of claim 20 in which a temperature near boiling is used.

22. A glauconitic material which has been treated with an alkali metal silicate solution for at least about an hour.

23. In a process of silicating glauconitic material, the silication step consisting in treating the glauconitic material with an alkali metal silicate solution only for a sufficient length of time to result in substantial improvement in the base exchange properties.

In testimony whereof I have hereunto signed my name.

ABRAHAM S. BEHRMAN.